US008972578B2

(12) United States Patent
Mitchell et al.

(10) Patent No.: US 8,972,578 B2
(45) Date of Patent: Mar. 3, 2015

(54) MASTER DATA MANAGEMENT SYSTEM FOR MONITORING CLOUD COMPUTING

(75) Inventors: Kent Mitchell, Denver, CO (US); Jason Heintz, Centennial, CO (US); Hollie McCurdy, Mountlake Terrace, WA (US); Carroll Moon, Alta Vista, WA (US); Mark Miller, Flower Mound, TX (US); Brian Feck, Charlotte, NC (US); Lou Nikodym, Golden, CO (US); Vadi Ramalingam, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 266 days.

(21) Appl. No.: 13/328,170

(22) Filed: Dec. 16, 2011

(65) Prior Publication Data

US 2013/0159529 A1    Jun. 20, 2013

(51) Int. Cl.
*G06F 15/173* (2006.01)
*G06F 15/16* (2006.01)
*G06F 15/177* (2006.01)

(52) U.S. Cl.
USPC ........... 709/226; 709/217; 709/221; 709/223; 709/227

(58) Field of Classification Search
CPC  G06F 11/0709; G06F 11/3409; G06F 15/173
USPC .......................... 709/217, 221, 223, 226, 227
See application file for complete search history.

(56) References Cited

U.S. PATENT DOCUMENTS

| 6,957,254 | B1 * | 10/2005 | Iterum et al. | 709/221 |
|---|---|---|---|---|
| 7,523,170 | B1 * | 4/2009 | Allen et al. | 709/217 |
| 8,527,639 | B1 * | 9/2013 | Liskov et al. | 709/228 |
| 2002/0064149 | A1 * | 5/2002 | Elliott et al. | 370/352 |
| 2004/0177156 | A1 * | 9/2004 | Hahn et al. | 709/240 |
| 2005/0015667 | A1 * | 1/2005 | Aaron | 714/25 |
| 2005/0278341 | A1 * | 12/2005 | Kostadinov et al. | 707/10 |
| 2006/0059253 | A1 * | 3/2006 | Goodman et al. | 709/223 |
| 2008/0270209 | A1 * | 10/2008 | Mauseth et al. | 705/7 |
| 2009/0171707 | A1 * | 7/2009 | Bobak et al. | 705/7 |
| 2009/0254572 | A1 * | 10/2009 | Redlich et al. | 707/10 |
| 2009/0265639 | A1 * | 10/2009 | Shuster | 715/747 |

(Continued)

OTHER PUBLICATIONS

"BinMaster Teams Up with Sprint on BinView Internet Bin Monitoring", Retrieved at <<http://binmaster.com/PDFs/Press%20Releases/062911_Sprint_PR.pdf>>, Retrieved Date: Sep. 29, 2011, pp. 2.
"A Web-based Approach to IT Asset Management", Retrieved at <<http://www.servtrax.com/ServTrax_WhitePaper.pdf>>, Dec. 19, 2007, pp. 1-12.

(Continued)

*Primary Examiner* — David Lazaro
*Assistant Examiner* — Vitali Korobov
(74) *Attorney, Agent, or Firm* — Louise Bowman; Jim Ross; Micky Minhas (57) ABSTRACT

An application provides cloud computing master data management. The application determines a rank associated with received server information from a server. The source rank is adjusted according to evaluation of server information against naming convention standards. The source rank is used in determining a category matching the server information. An assigned category includes instructions to configure assets of a server. The application assembles configuration information from the assigned category and provides the configuration information to the server.

16 Claims, 7 Drawing Sheets

(56) References Cited

U.S. PATENT DOCUMENTS

| | | |
|---|---|---|
| 2010/0217864 A1 | 8/2010 | Ferris |
| 2010/0332629 A1 | 12/2010 | Cotugno et al. |
| 2011/0145657 A1* | 6/2011 | Bishop et al. ............ 714/47.1 |
| 2011/0153465 A1* | 6/2011 | Pombo et al. ............ 705/27.1 |
| 2011/0225467 A1 | 9/2011 | Betzler et al. |
| 2012/0005273 A1* | 1/2012 | Rathod et al. ............ 709/204 |
| 2012/0089617 A1* | 4/2012 | Frey ............................ 707/748 |
| 2012/0131166 A1* | 5/2012 | Barbedette et al. ........ 709/223 |

OTHER PUBLICATIONS

"Vector Asset Manager Pro v5", Retrieved at <<http://www.vector-networks.com/newsite/AM_Pro_SS_USL.pdf>>, Retrieved Date: Sep. 29, 2011, pp. 2.

Hoffman, Joshua, "Cloud Computing: The Power of System Center in the Cloud", Retrieved at <<http://technet.microsoft.com/en-us/magazine/gg585214.aspx>>, Feb. 2011, pp. 1-3.

* cited by examiner

MASTER DATA MANAGEMENT SYSTEM FOR MONITORING CLOUD COMPUTING

BACKGROUND

Distributed computing technologies have enabled multiple computing resources to provide coordinated and distinct solutions. An example of distributed computing, cloud computing brings together multiple systems to provide solutions to user needs. Cloud computing can span a vast array of computing resources. The computing resources utilized in cloud computing applications are dispersed across networks and locations. Dispersed computing resources are remotely controlled and managed. Usually, manual or scripted solutions provide installation and configuration support to cloud computing assets. Manual installation solutions by human components of widely dispersed computing resources are not cost effective. Scripted solutions are not flexible to meet dynamic requirements.

Conventional scripted solutions for cloud computing systems have limitations. Scripts preconfigure server assets according to customer requirements, but subsequent support for alterations may typically lack. Customization during server use may prevent a script provider from adjusting installation scripts to account for the customizations. Additionally, configuration enforcement may prevent the script provider from scaling up to customer requirements. Conventional scripted installation approaches also frequently require human intervention to configure parameters and other values to maintain normalized operations. Furthermore, end user based post-installation needs may be difficult if not impossible to implement.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to an operations management system for monitoring cloud computing resources and operations through a server categorization and inventory system. According to some embodiments, an application may provide master data management for cloud computing. The application may receive server information from a server. The server may have one or more role category as a customer server, datacenter server, or a service server. The application may determine a source rank from the server information. The source rank may quantify the quality of the information received from the server. The application may determine one or more categories for the server according to the source rank and the server information. The source rank may be evaluated against range parameters of the category to determine matches. The server may be assigned to a role category according to the matched range. Subsequently, the application may provide configuration information associated with the one or more category. The configuration information may include business rules and logic to configure the server according to the assigned category.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, an application may provide cloud computing master data management. The application may receive server information from a server. The server may include information identifying services to be offered by the server such as data services. Next, the application may determine a source rank associated with the server information. The source rank may be analyzed according to naming convention standards. The application may evaluate service names against the naming convention and provide a source rank accordingly. Subsequently, the application may determine one or more categories for the server according to the source rank and the server information. The source rank may enable the server to fit a category parameter. Additionally, service information may match other category parameters. Upon determining a category, the application may provide configuration information associated with the category to the server. The configuration information may include business rules and logic to setup server assets.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in the limiting sense, and the scope of the present invention is defined by the appended claims and their equivalents. While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable media.

According to embodiments, an application may manage master data for cloud computing. Master data may encompass configuration information including relationship information with other cloud computing components such as other servers or applications. The configuration information may also include data store configurations. The configuration information may include a default data store configuration instructions to a server upon identifying the server as belonging to a specific category. Yet in other embodiments, the configuration information may include executable code associated with the server information. The executable code (upon execution) may create server assets such as objects, and jobs.

Figure 1:
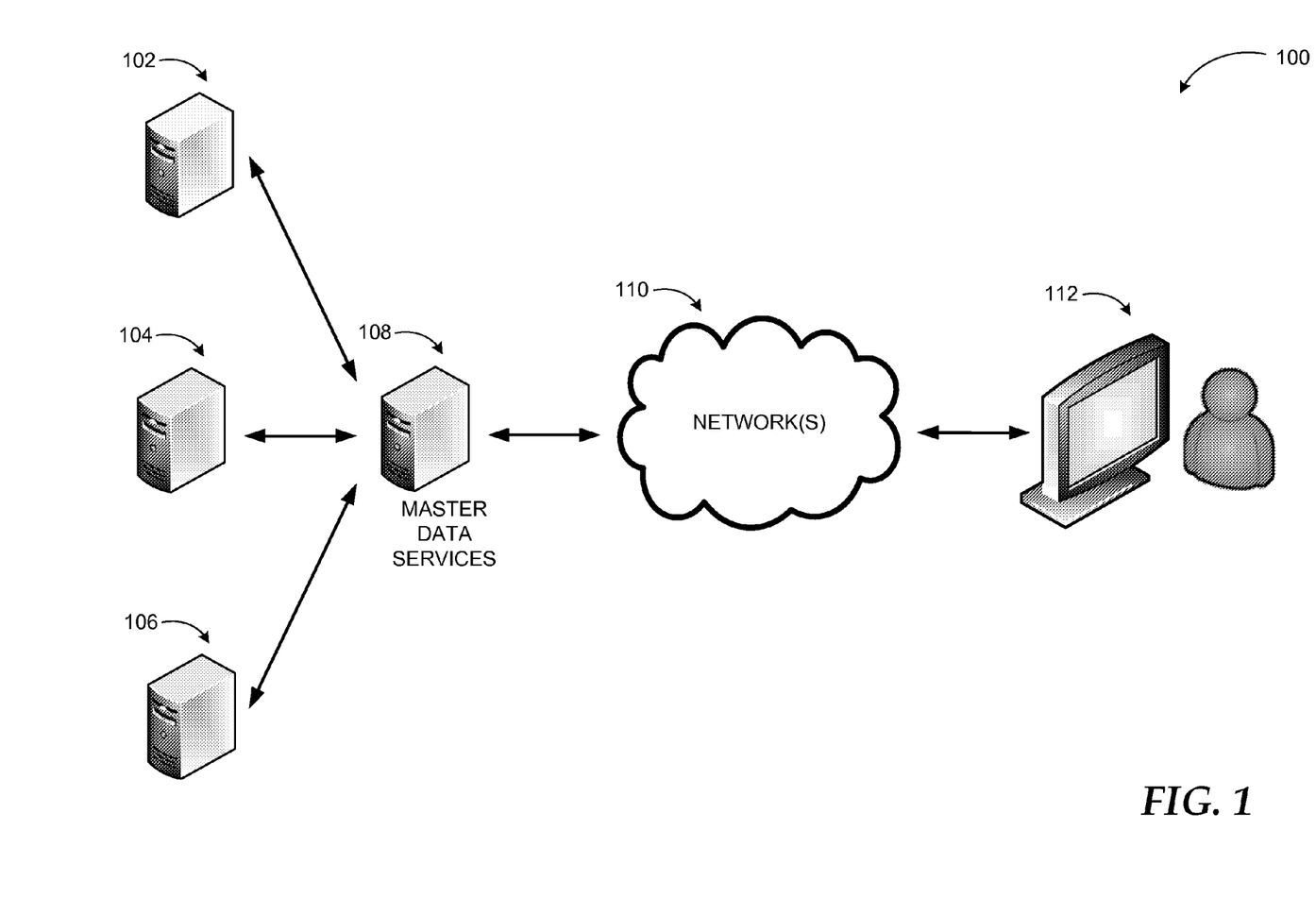
FIG. 1 illustrates an example conceptual network diagram of a system providing cloud computing master data management.

FIG. 1 illustrates an example conceptual network diagram of a system providing master data management for cloud computing. Diagram 100 displays network components interacting with an application providing configuration information to other servers. The application may run on a master data services server 108. The master data services server 108 may receive server information from multiple servers 102, 104, and 106. The servers 102, 104, and 106 may be part of group of servers providing a service such as data management. Alternatively, the servers 102,104, and 106 may be independent and provide variety of services to end users or other applications and servers. Additionally, the servers 102, 104, and 106 may be local or remote servers.

The application may assign a source rank to the service information from servers 102, 104, and 106. The assignment may be performed through a variety of analysis methods including evaluating data source and service information of the server information. The application of the master data services server 108 may categorize the server information according to the assigned source rank and additional parameters in the server information. An end user 112 may be enabled to manually map the server information to a category by accessing the application of master data services server 108 through network(s) 110.

Figure 2:
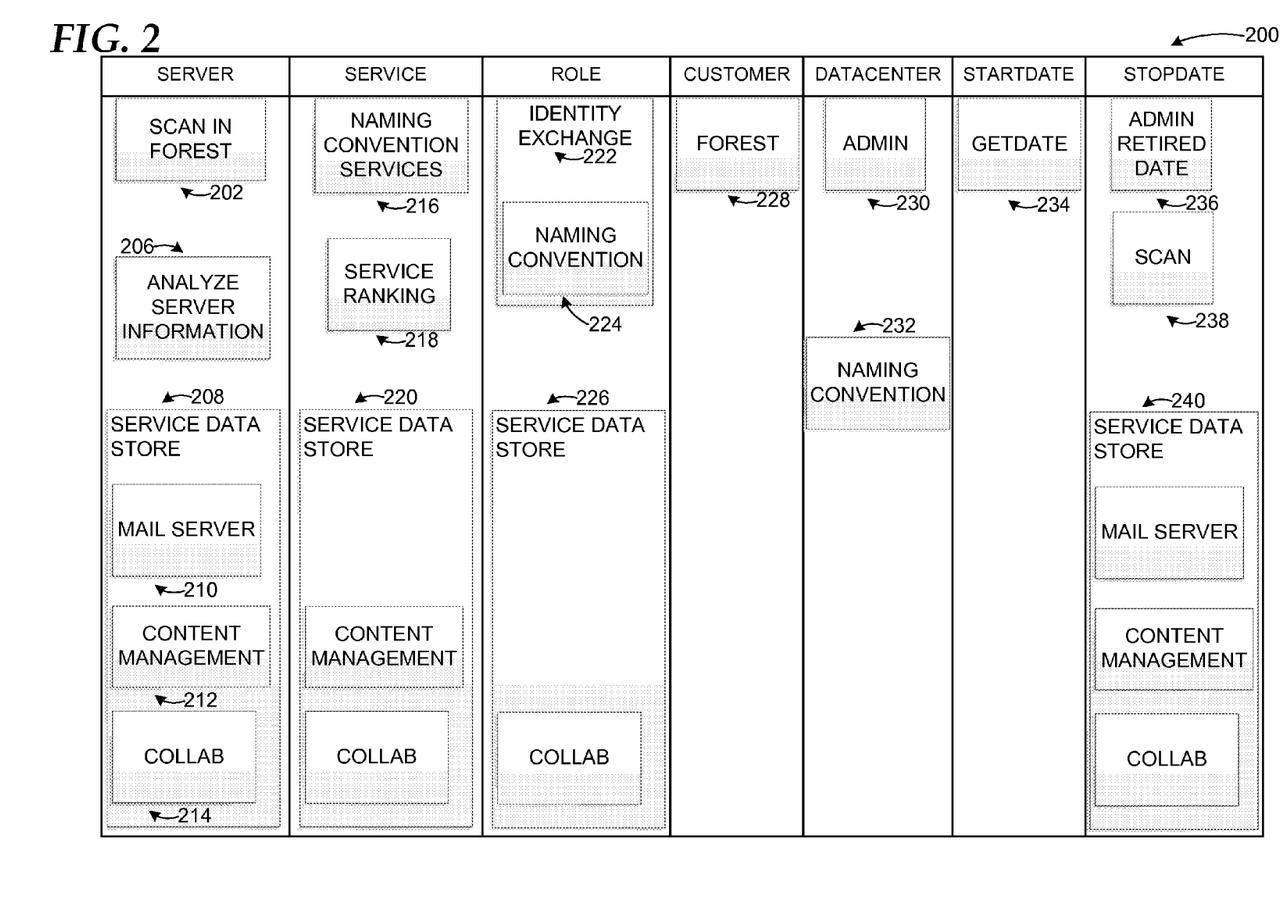
FIG. 2 illustrates example flow diagram of a system providing cloud computing master data management according to embodiments.

FIG. 2 illustrates example flow diagram of a system providing cloud computing master data management according to embodiments. Diagram 200 displays management application processes and configuration information components. The management application scans a forest of servers 202 to retrieve server information for new servers and existing servers with updated settings. Alternatively, the management application may receive server information from the forest. Initial step in assigning a category to received server information may include analysis of server information 206. The analysis may scrutinize parameters contained in the server information to match against parameters of one or more categories. The analysis may also provide a source rank to the server information to map against a threshold for a category. According to the determined source rank and other matching server information parameters, configuration information may be assembled such as service team data store configuration information 208. The service data store configuration information 208 may contain components from categories having mail server 210, content management 212, and collaboration 214 roles. Each category role may provide additional business rules and logic to the configuration information.

In a service analysis, the application may scrutinize and rank service information 218 from the server information using naming convention services 216. In an example scenario, the naming convention based ranking may remove mail server role from the configuration information 220. Additionally, the application may complete a role analysis within an identity exchange 222 and further scrutinize server behavior retrieved from the server information against naming convention standards 224. The analysis may lower the value of the source rank to remove the server information from a range corresponding to content management category. As such, configuration information 226 may include, for example, business rules and logic to configure according to a collaboration server role based configuration.

According to other embodiments, the management application may specifically determine customer role based category within the server information by analyzing the forest 228 and determining similar servers providing services to third parties. Additionally, the management application may analyze datacenter based role from the server information by evaluating the server information through an administrative process 230. The datacenter role analysis may be scrutinized against naming convention standards 232 to adjust the source rank.

The application may receive a start date for the server configuration through a get date 234 process. The application may also be capable of implementing server stop operations through for service data store configuration information 240 of the server. Stop configuration may be done by stop date processes including administrative retired date process 236 providing termination timestamp and scan process 238 to instigate propagation of the stop business rules and logic to the server. Additionally, the scan process 238 may scan the forest for servers in need of stop configuration information according to the stop date parameter in server information.

According to other embodiments, a category may include a server assigned to one or more roles from the following: a customer server, a datacenter server, a service server, etc. The management application may create the configuration information from relationship information with other cloud computing components (such as other servers), data store configuration, and executable code associated with the server information. The management application may store the configuration information in a normalized data store and provide the configuration information from the normalized data store. Additionally, the configuration information may include business logic and rules to create a data store in the server, deploy source to the data store, and create data store objects and jobs associated with the source code in the data store. The management application may gather business rules from manual and automated sources to map the server information to one or more categories. A manual source may be an end user. An automated source may be a standards provider defining categories.

According to yet other embodiments, the management application may retrieve business rules for the source rank from one or more standards sources. The standards sources may include master data management methodology, relational database integrity, computer asset lifecycle management, and customer metadata management sources. Additionally, the management application may determine a source rank by evaluating data source information and service information within the server information. The application may apply reliability metrics to known data source and service information and adjust the source rank according to the reliability metrics.

Figure 3:
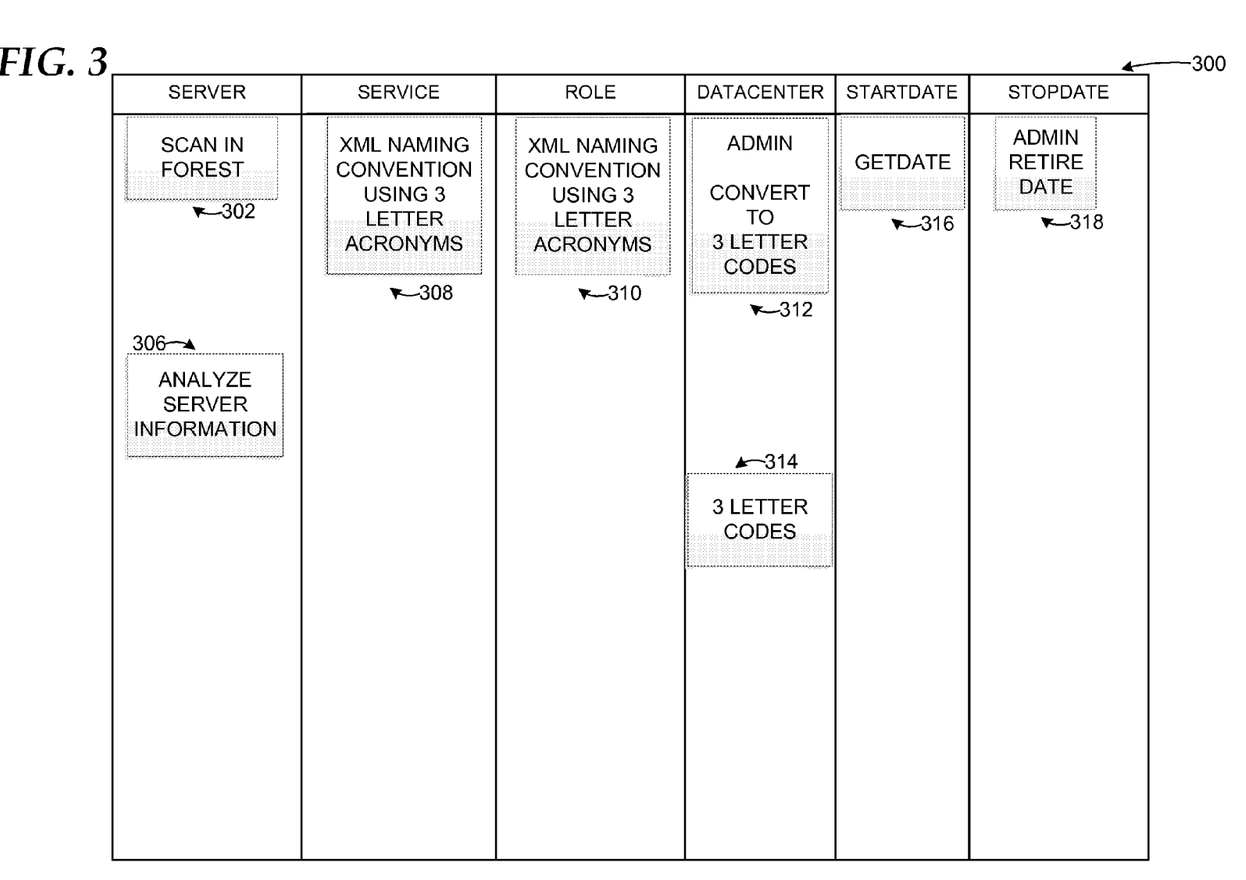
FIG. 3 illustrates another example flow diagram of the system providing cloud computing master data management according to embodiments.

FIG. 3 illustrates another example flow diagram of the system providing cloud computing master data management according to embodiments. Diagram 300 displays an example application processes. The management application may retrieve server information from the server by scanning a forest of servers 302. The received server information may be analyzed 306 to rank the source. The source may be ranked according to the server services information extracted from the server information. The application may utilize extensible markup language (XML) convention standards using 3 letter acronyms 308 to determine whether service names match service categories provided by the XML naming convention. Similarly, the application may evaluate the server information against role parameters provided by XML naming convention standards 308. If the server information matches the XML naming convention, the application may adjust a source rank. A higher source rank may meet category parameters and allow the application to assign a matched category to the server information. The application may also evaluate additional server roles through XML naming convention analysis process 310. Of course other naming conventions, standards, or analysis methods may also be employed.

According to other embodiments, the management application may evaluate the server information in a datacenter role analysis. The application may convert datacenter parameters provided by the server information to 3 letter codes in an administrative process 312 to match against 3 letter codes 314 provided by XML naming convention standards or comparable ones. Additionally, the application may receive a start date for the configuration information through a get date process 316. Subsequently, the application may insert time stamped (stop date) stop business rules and logic into the configuration information through an administrative retire date process 318. The application may propagate service retirement business rules and logic along with the configuration information.

According to yet other embodiments, the application may retrieve a naming convention from one or more standards sources. The application may evaluate service names from the server information against the naming convention and adjust the source rank according to number of matched service names against the naming convention.

According to further embodiments, the application may assign one or more categories to the server information based on the source rank meeting a predetermined threshold. The threshold may be set by the standards sources. Additionally, the application may adjust alerts configuration for the server according to the configuration information and detect alerts from the server according to the alerts configuration. Alternatively, the application may adjust monitoring configuration for the server according to configuration information and monitor the server according to the monitoring configuration.

The application may capture performance metrics from the server according to the monitoring configuration.

Figure 4:
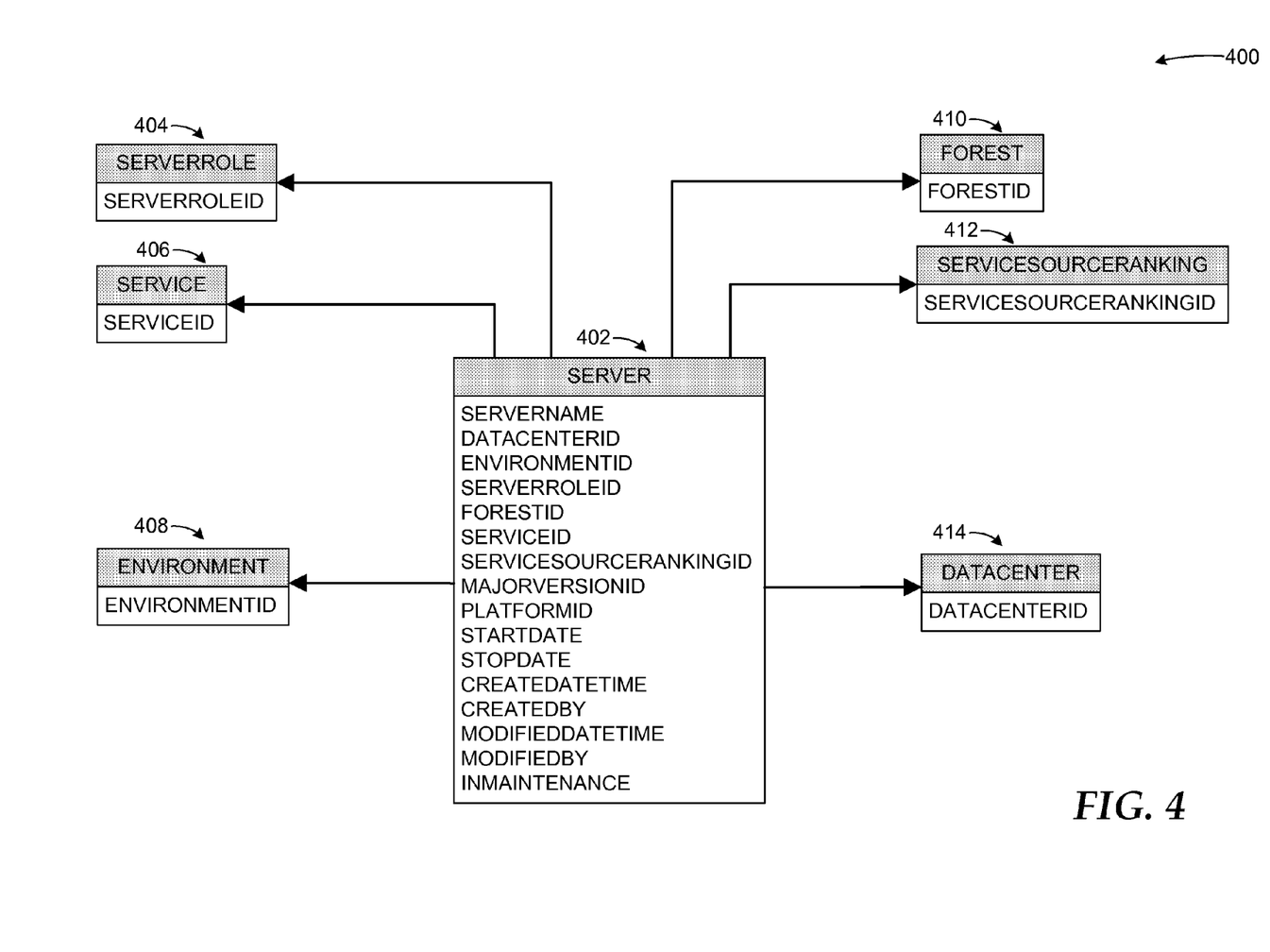
FIG. 4 illustrates an example data schema of a system providing cloud computing master data management according to embodiments.

FIG. 4 illustrates example data schema of a system providing cloud computing master data management according to embodiments. Diagram 400 displays example data tables of the data schema utilized by the application.

A data schema according to embodiments may have a "SERVER" table 402 to host server information relating the server information to other master data management tables. An "ENVIRONMENT" table 408 may store values to identify the environment such as a customer environment in which the server services are provided. A "SERVICE" table 406 may store service information such as service name and parameters about the services provided by the server. A "SERVERROLE" table 404 may store category information and parameters to assign to the server. The "SERVERROLE" table may also include business rules and logic for the categories to include in the configuration information. A "FOREST" table 410 may include information about server's group or network. The "FOREST" table 410 may include parameters about the services offered by the group of servers. A "SERVICESOURCERANKING" table 412 may contain information about the source rank including parameters to assign a source rank according to matching server information. A "DATACENTER" table 414 may include information and parameters to match data center role category specific information retrieved from the server information.

The example source rank, naming conventions, and categories depicted in FIG. 1 through FIG. 4 are provided for illustration purposes only. Embodiments are not limited to these specific examples, and may be implemented using other configurations, standards, and methods employing the principles described herein.

Figure 5:
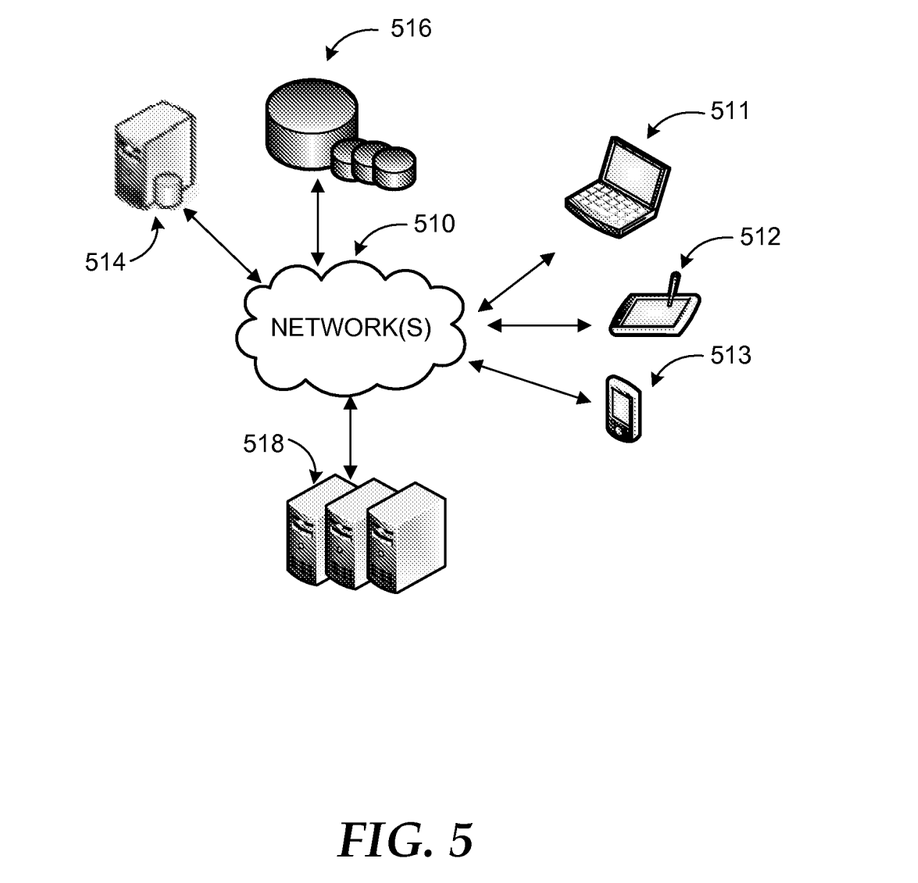
FIG. 5 is a networked environment, where a system according to embodiments may be implemented.

FIG. 5 is a networked environment, where a system according to embodiments may be implemented. In addition to locally installed applications, such as application 622 discussed below, providing master data management for cloud computing may be also be employed in conjunction with hosted applications and services that may be implemented via software executed over one or more servers 518 or an individual server. A hosted service or application may communicate with client applications on individual computing devices such as a handheld computer, a desktop computer, a laptop computer 511, a tablet computer 512 (or slate), a smart phone 513, ('client devices') through network(s) 510 and provide cloud computing master data management.

As previously discussed, cloud computing master data management may be provided by the hosted service or application. The configuration information may be generated subsequent to server information analysis, ranking, and categorization.

Client devices 511-513 are used to access the functionality provided by the hosted service or application. One or more of the servers 518 or a server may be used to provide a variety of services as discussed above. Relevant data may be stored in one or more data stores (e.g. data store 514), which may be managed by any one of the servers 518 or by database server 514.

Network(s) 510 may comprise any topology of servers, clients, Internet service providers, and communication media. A system according to embodiments may have a static or dynamic topology. Network(s) 510 may include a secure network such as an enterprise network, an unsecure network such as a wireless open network, or the Internet. Network(s) 510 may also coordinate communication over other networks such as PSTN or cellular networks. Network(s) 510 provides communication between the nodes described herein. By way of example, and not limitation, network(s) 510 may include wireless media such as acoustic, RF, infrared and other wireless media.

Many other configurations of computing devices, applications, data sources, and data distribution systems may be employed to provide master data management for cloud computing. Furthermore, the networked environments discussed in FIG. 5 are for illustration purposes only. Embodiments are not limited to the example applications, modules, or processes.

Figure 6:
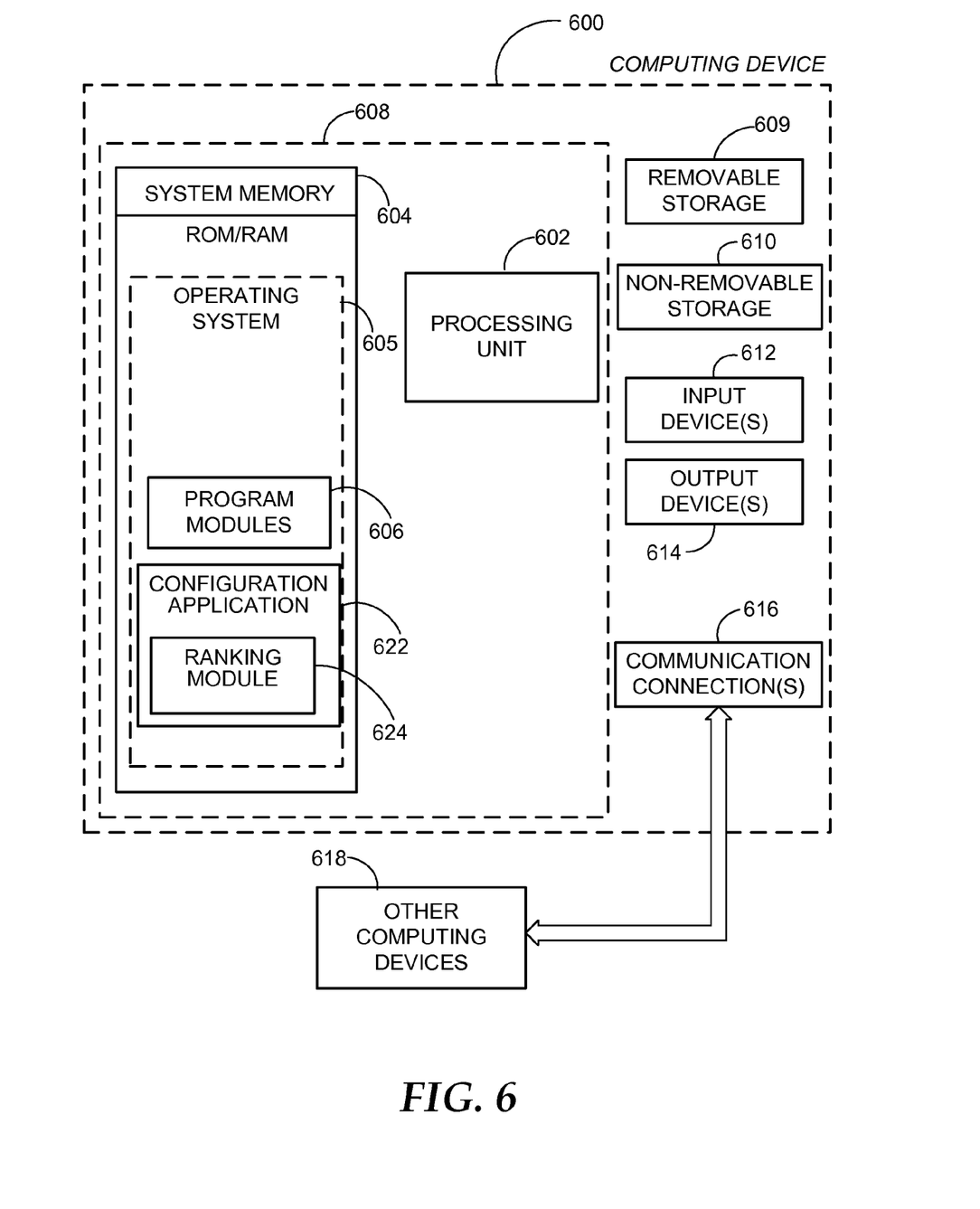
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment according to embodiments is illustrated, such as computing device 600. In a basic configuration, computing device 600 may be any management device in stationary, mobile, or other form such as the example devices discussed in conjunction with FIG. 1, and include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating system from MICROSOFT CORPORATION of Redmond, Wash. The system memory 604 may also include one or more software applications such as program modules 606, configuration application 622, and ranking module 624.

Ranking module 624 may operate in conjunction with the operating system 605 or configuration application 622 and provide configuration information as discussed previously. Ranking module 624 may also assign a source rank to server information utilized in matching a category to the server information. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, an optical capture device for detecting gestures, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wireless network in a distributed computing environment, a satellite link, a cellular link, and comparable mechanisms. Other devices 618 may include computer device(s) that execute communication applications, other directory or policy servers, and comparable devices. Communication connection(s) 616 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be with a machine that performs a portion of the program.

Figure 7:
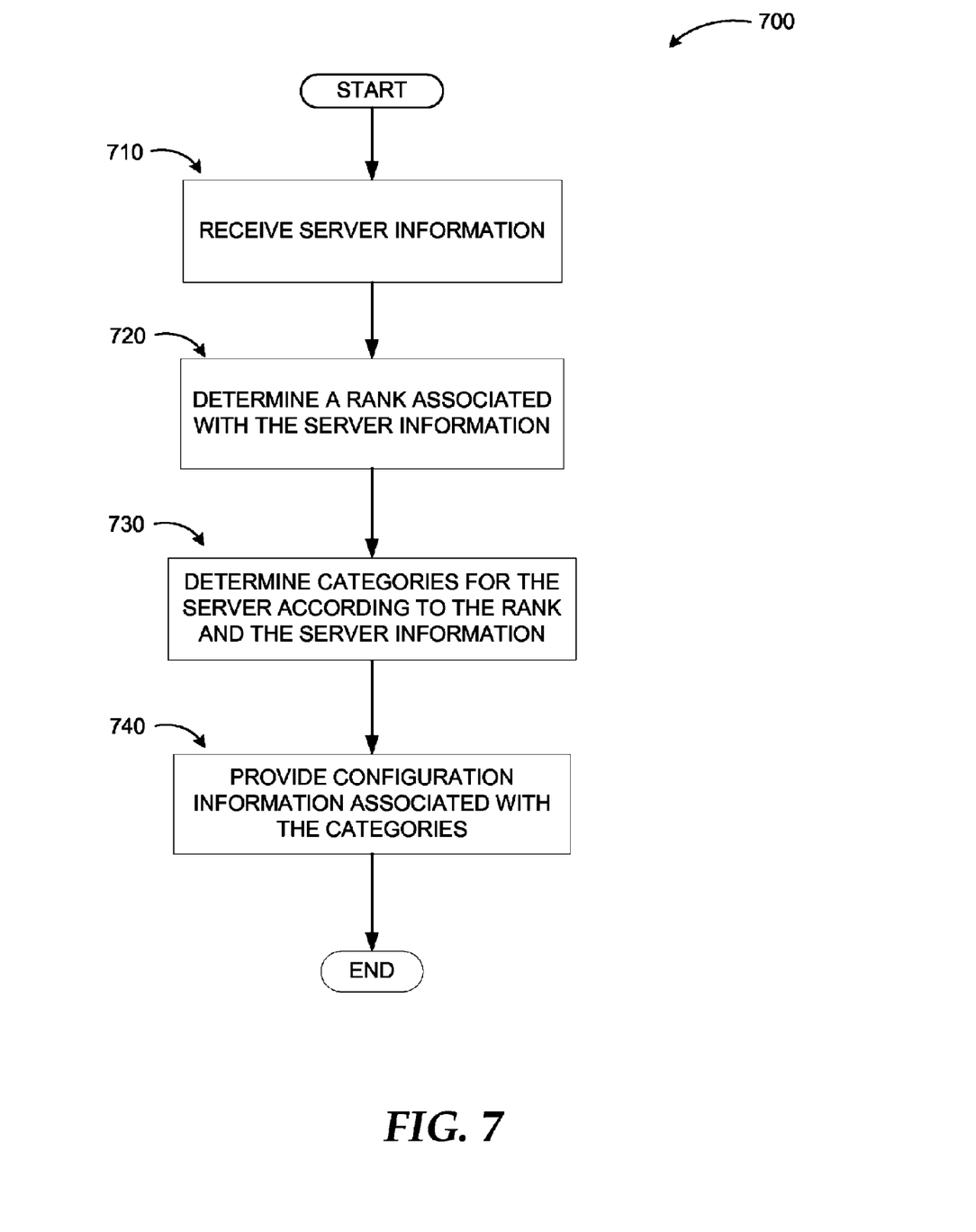
FIG. 7 illustrates a logic flow diagram for a process of providing cloud computing master data management according to embodiments.

FIG. 7 illustrates a logic flow diagram for a process of providing cloud computing master data management according to embodiments. Process 700 may be implemented as part of an application or an operating system of any computing device capable of propagating configuration information to servers.

Process 700 begins with operation 710, where an application may receive server information from a server. The server information may include parameters and identifiers about the server function. Subsequently, the application may determine a rank associated with the server information at operation 720. The application may adjust up and down a source rank according to the server information matching standards parameters such as naming convention parameters. Next, the application may determine categories for the server according to the source rank and the server information at operation 730. A category may have range parameters to evaluate the source rank. An example may be a customer service server having a high source rank in order to match a specific customer category and provide customized configuration information. At operation 740, the application may provide configuration information associated with the categories. The configuration information may include business rules and logic to implement server assets such as data stores.

The operations included in process 700 are for illustration purposes. Providing cloud computing master data management according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part in a computing device for providing cloud computing master data management, the method comprising:
   receiving server information from a server;
   retrieving business rules for a source rank from a standards source including at least one from a set of: a master data management methodology source, a relational database integrity source, a computer asset lifecycle management source, and a customer metadata management source;
   determining the source rank associated with the server information by analyzing the server information with the business rules of the source rank;
   applying reliability metrics to the server information;
   retrieving a naming convention from the standards source;
   evaluating service names from the server information against the naming convention;
   adjusting the source rank according to the reliability metrics and a number of matched service names against the naming convention, wherein the adjustment lowers a value of the source rank to remove the server information from a range corresponding to a content management category;
   determining at least one category for the server according to the source rank and the server information, wherein the at least one category includes range parameters to evaluate the source rank; and
   providing configuration information associated with the at least one category.

2. The method of claim 1, wherein the at least one category includes a server role from the set of: a customer server, a datacenter server, and a service server.

3. The method of claim 1, further comprising:
   creating the configuration information from: relationship information with other cloud computing components, data store configuration, and executable code associated with the server information; and
   storing the configuration information in a normalized data store.

4. The method of claim 3, further comprising:
   providing the configuration information from the normalized data store.

5. The method of claim 1, wherein the configuration information includes business logic and rules to perform at least one from a set of:
   creating a data store in the server;
   deploying source code to the data store; and
   creating data store objects and jobs associated with the source code in the data store.

6. The method of claim 1, further comprising:
   gathering business rules from manual and automated sources to map the server information to the at least one category.

7. The method of claim 1, wherein determining the source rank further comprises evaluating data source information within the server information.

8. The method of claim 1, wherein determining the source rank further comprises evaluating service information within the server information.

9. A computing device for providing cloud computing master data management, the computing device comprising:
   a memory;
   a processor coupled to the memory, the processor executing a management application and providing services associated with the management application to manage master data, wherein the processor is configured to:
   receive server information from a server;
   retrieve business rules for a source rank from a standards source including at least one from a set of:
      a master data management methodology source,
      a relational database integrity source,
      a computer asset lifecycle management source, and
      a customer metadata management source;
   determine the source rank associated with the server information by analyzing the server information with the business rules of the source rank;
   apply reliability metrics to the server information;
   retrieve a naming convention from the standards source;
   evaluate service names from the server information against the naming convention;
   adjust the source rank according to number of matched service names against the naming convention, wherein the evaluation lowers a value of the source rank to remove the server information from a range corresponding to a content management category;
   determine at least one category for the server according to the source rank and the server information, wherein the at least one category includes range parameters to evaluate the source rank; and
   provide configuration information associated with the at least one category.

10. The computing device of claim 9, wherein the naming convention stores service names in 3 letter acronyms in extensible markup language (XML) format.

11. The computing device of claim 9, wherein the processor is further configured to:
   assign the at least one category to the server information based on the source rank meeting a predetermined threshold.

12. The computing device of claim 9, wherein the server is one from a set of: a local server and a remote server.

13. A computer-readable memory device with instructions stored thereon for providing cloud computing master data management, the instructions comprising:
   receiving server information from a server;
   retrieving business rules for a source rank from a standards source including at least one from a set of: a master data management methodology source, a relational database integrity source, a computer asset lifecycle management source, and a customer metadata management source;
   determining the source rank associated with the server information by analyzing the server information with the business rules of the source rank;
   applying reliability metrics to the server information;
   retrieving a naming convention from the standards source;
   evaluating service names from the server information against the naming convention;
   adjusting the source rank according to the reliability metrics and a number of matched service names against the naming convention, wherein the evaluation adjustment lowers a value of the source rank to remove the server information from a range corresponding to a content management category;
   determining at least one category for the server according to the source rank and the server information, wherein the at least one category includes range parameters to evaluate the source rank; and providing configuration information associated with the at least one category.

14. The computer-readable memory device of claim 13, wherein the instruction further comprise:

adjusting an alerts configuration for the server according to the configuration information; and detecting alerts from the server according to the alerts configuration.

15. The computer-readable memory device of claim 13, wherein the instructions further comprise:

adjusting a monitoring configuration for the server according to the configuration information; and monitoring the server according to the monitoring configuration.

16. The computer-readable memory device of claim 15, wherein the instructions further comprise:

capturing performance metrics from the server according to the monitoring configuration.

* * * * *